United States Patent
Tadesse et al.

(10) Patent No.: US 12,429,995 B2
(45) Date of Patent: Sep. 30, 2025

(54) COLLABORATIVE WIDGET STATE SYNCHRONIZATION

(71) Applicant: Figma, Inc., San Francisco, CA (US)

(72) Inventors: Bersabel Tadesse, San Francisco, CA (US); Sawyer Hood, San Francisco, CA (US); Yi Tang Jackie Chui, San Francisco, CA (US); Michael Yong, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 18/121,520

(22) Filed: Mar. 14, 2023

(65) Prior Publication Data

US 2023/0297208 A1 Sep. 21, 2023

Related U.S. Application Data (60) Provisional application No. 63/320,634, filed on Mar. 16, 2022.

(51) Int. Cl.
*G06F 3/04812* (2022.01)

(52) U.S. Cl.
CPC ................. *G06F 3/04812* (2013.01)

(58) Field of Classification Search
None
See application file for complete search history.

(56) References Cited

U.S. PATENT DOCUMENTS

| | | | |
|---|---|---|---|
| 5,339,389 A * | 8/1994 | Bates | G06Q 10/10 715/742 |
| 6,088,709 A | 7/2000 | Watanabe | |
| 7,770,122 B1 * | 8/2010 | Shaik | G06F 16/958 715/744 |
| 8,533,580 B1 | 9/2013 | Xu | |
| 9,424,545 B1 * | 8/2016 | Lee | G06Q 10/063114 |

(Continued)

FOREIGN PATENT DOCUMENTS

| | | |
|---|---|---|
| EP | 0576178 | 12/1993 |
| EP | 2775397 A2 | 9/2014 |

(Continued)

OTHER PUBLICATIONS

ComputerLanguage.com (CLC), widget Definition (Year: 2021).*

(Continued)

*Primary Examiner* — Gabriel Mercado
(74) *Attorney, Agent, or Firm* — Squire Patton Boggs LLP; Sarah Mirza (57) ABSTRACT

A computing system receives position data from each of a plurality of user computing devices, the position data indicating a cursor position on a collaborative user interface for each collaborator during a collaborative session. The system determines, based on the position data, whether the cursor position of a respective collaborator is within a bounding area of a widget presented on the collaborative user interface. When the cursor position of the respective collaborator is within the bounding area of the widget, the system transmits feedback response data to each of the plurality of user computing devices to cause a corresponding feedback response for the widget to be presented on the collaborative user interface displayed on each of the plurality of user computing devices.

18 Claims, 5 Drawing Sheets

(56) References Cited

U.S. PATENT DOCUMENTS

| | | |
|---|---|---|
| 9,430,229 B1 | 8/2016 | Zijst |
| 9,477,649 B1 | 10/2016 | Davidson |
| 10,129,188 B2 | 11/2018 | Liu |
| 10,606,576 B1 | 3/2020 | Tung |
| 10,620,921 B2 | 4/2020 | Brebner |
| 11,010,542 B2 | 5/2021 | Nelson |
| 11,138,518 B1 | 10/2021 | Yu |
| 2004/0054627 A1 | 3/2004 | Rutledge |
| 2007/0118794 A1 | 5/2007 | Hollander |
| 2008/0040426 A1 | 2/2008 | Synstelien |
| 2009/0300475 A1* | 12/2009 | Fink ............... H04N 21/4781 726/4 |
| 2010/0037149 A1 | 2/2010 | Heath |
| 2010/0192107 A1 | 7/2010 | Takahashi |
| 2010/0306181 A1 | 12/2010 | Little |
| 2011/0047532 A1 | 2/2011 | Wang |
| 2011/0113350 A1 | 5/2011 | Carlos |
| 2011/0268262 A1 | 11/2011 | Jones |
| 2012/0247967 A1 | 10/2012 | James |
| 2013/0013089 A1 | 1/2013 | Kawakami |
| 2013/0014023 A1 | 1/2013 | Lee |
| 2013/0031208 A1 | 1/2013 | Linton |
| 2013/0097476 A1 | 4/2013 | Koroda |
| 2013/0111338 A1 | 5/2013 | Huo |
| 2013/0117714 A1* | 5/2013 | Rhee ................ G06F 40/177 715/823 |
| 2013/0124967 A1 | 5/2013 | Hatfield |
| 2014/0108963 A1 | 4/2014 | Black |
| 2014/0258968 A1 | 9/2014 | Brown |
| 2014/0298153 A1 | 10/2014 | Tsujimoto |
| 2014/0310660 A1 | 10/2014 | Rosen |
| 2015/0032366 A1 | 1/2015 | Man |
| 2015/0127753 A1 | 5/2015 | Tew |
| 2015/0302338 A1 | 10/2015 | Zaveri |
| 2016/0110063 A1 | 4/2016 | Connolly |
| 2016/0232785 A1 | 8/2016 | Wang |
| 2016/0321449 A1 | 11/2016 | Surti |
| 2016/0343156 A1 | 11/2016 | Yoshizawa |
| 2016/0358467 A1 | 12/2016 | Jeong |
| 2017/0109139 A1 | 4/2017 | Bitner |
| 2017/0192656 A1* | 7/2017 | Pedrick ............... G06F 3/04847 |
| 2017/0262294 A1 | 9/2017 | Yakan |
| 2017/0293544 A1 | 10/2017 | Katayama |
| 2017/0339370 A1 | 11/2017 | Inoue |
| 2018/0121039 A1 | 5/2018 | Bliss |
| 2018/0173701 A1 | 6/2018 | Kim |
| 2018/0174446 A1 | 6/2018 | Wang |
| 2018/0181299 A1 | 6/2018 | Ouellette et al. |
| 2018/0285084 A1 | 10/2018 | Mimlitch, III |
| 2018/0315248 A1 | 11/2018 | Bastov |
| 2018/0337880 A1 | 11/2018 | Sokolov |
| 2018/0350144 A1 | 12/2018 | Rathod |
| 2019/0129927 A1 | 5/2019 | Okamoto |
| 2019/0146811 A1 | 5/2019 | Pell |
| 2019/0179501 A1 | 6/2019 | Seeley |
| 2019/0236975 A1 | 8/2019 | Chong |
| 2019/0238602 A1 | 8/2019 | Lo |
| 2019/0303880 A1 | 10/2019 | Hashimoto |
| 2019/0361580 A1* | 11/2019 | Dowling ............... G06F 3/0484 |
| 2020/0042648 A1 | 2/2020 | Rao |
| 2020/0050431 A1 | 2/2020 | Zilouchian Moghaddam |
| 2020/0296147 A1 | 9/2020 | Eliason |
| 2021/0208775 A1 | 7/2021 | Allington |
| 2021/0367986 A1 | 11/2021 | Davuluri et al. |
| 2022/0108276 A1 | 4/2022 | Stringham |
| 2022/0129118 A1 | 4/2022 | Hsu |
| 2022/0191594 A1 | 6/2022 | Devoy, III |
| 2022/0263675 A1 | 8/2022 | Cupala |
| 2022/0334704 A1 | 10/2022 | Lin |
| 2022/0334806 A1 | 10/2022 | Lin |
| 2022/0342644 A1 | 10/2022 | Fuetsch |

FOREIGN PATENT DOCUMENTS

| | | |
|---|---|---|
| EP | 3293619 | 3/2018 |
| EP | 3633472 A1 | 4/2020 |
| WO | WO-2009/132444 A1 | 11/2009 |
| WO | WO-2019/209391 A1 | 10/2019 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

International Search Report and The Written Opinion of The International Searching Authority mailed Jul. 25, 2022, for related PCT/US2022/025840 filed Apr. 20, 2022, 17 pages.

International Search Report and The Written Opinion of The International Searching Authority mailed Feb. 1, 2023, for related PCT/US2022/047191 filed Oct. 19, 2022, 16 pages.

International Search Report and The Written Opinion of The International Searching Authority mailed Mar. 1, 2023 for related PCT/US2022/050134 filed Nov. 16, 2022, 10 pages.

Philippe Charles et al.: "Accelerating the creation of customized, language-specific IDEs in Eclipse", ACM SIGPLAN Notices, Association for Computing Machinery, US, vol. 44, No. 10, Oct. 25, 2009 (Oct. 25, 2009), pp. 191-206, XP058304685; ISSN: 0362-1340, DOI: 10.1145/1639949.1640104; p. 192, right-hand column, line 25-35, p. 196, right-hand column, line 6-13, abstract.

Anonymous: "HTML editor—Wikipedia". Apr. 13, 2022 pp. 1-4.

International Search Report and Written Opinion mailed Jun. 27, 2023 in PCT/US2023/015322.

International Search Report dated Aug. 18, 2023 in PCT/US2023/020890.

IPRP dated Jul. 3, 2024 in PCT/US2023/020890.

Written Opinion dated Apr. 10, 2024 in PCT/US2023/020890.

"Zack Qattan, "Collaborative Cursor Chat w/Croquet", Nov. 30, 2020, youtube.com, https://www.youtube.com/watch?v=NiqTCROdlgw, pp. 1-15 (Year: 2020)".

Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.

International Search Report and The Written Opinion of The International Searching Authority mailed Dec. 12, 2022, for related PCT/US2022/041418 filed Aug. 24, 2022, 11 pages.

International Search Report and The Written Opinion of The International Searching Authority mailed Jul. 1, 2022, for related PCT/US2022/025626, filed Apr. 20, 2022, 17 pages.

International Search Report and The Written Opinion of The International Searching Authority mailed Nov. 28, 2022, for related PCT/US2022/040461 filed Aug. 16, 2022, 14 pages.

Paper by WeTransfer—Simple Sketch App, "Creativity at your fingertips" URL:https://web.archive.org/web/20220121205009/https://wetransfer.com/paper, 9 pages.

Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.

* cited by examiner

COLLABORATIVE WIDGET STATE SYNCHRONIZATION

RELATED APPLICATIONS

This application claims benefit of priority to Provisional U.S. Patent Application No. 63/320,634, filed Mar. 16, 2022; the aforementioned priority application being hereby incorporated by reference in its entirety.

TECHNICAL FIELD

Examples described herein relate to an integrated application platform and providing collaborative tools for implementing widgets.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. Widgets on a user interface of an application enable user interaction with the user interface, and can comprise buttons, scroll features, hover-over elements, and other selectable objects on the user interface that collectively create the user experience.

DETAILED DESCRIPTION

Examples include a computing system that can operate to implement an interactive collaborative application platform (ICAP) to enable real-time collaboration by users on one or more mediums. According to examples, a computing device can operate one or more application services of an ICAP to selectively render one or more interactive elements. As described with examples, the interactive elements can include widgets, which include interactive objects that are implemented by discrete logic (e.g., third-party code). Interactive objects such as provided by widgets can be executed and rendered on a collaborative medium or user interface of an application service. Examples as described further provide for the widget objects to be persistent and dynamically responsive to different types of user input, using functionality provided with the widget.

According to examples, a network computer system operates to enable multiple user computing devices to utilize any one of multiple collaborative application services to create and update content rendered on a collaborative medium or user interface. As a collaborative environment, the network computer system detects changes to a canvas on which user-generated content (e.g., UI design) made by one or multiple collaborators using is provided. In some examples, the user-generated content elements can be the result of user interaction with a suite of interactive tools which are provided with or in connection with the canvas. Further, the canvas and content elements can be rendered on multiple computing devices of the collaborators. Further, the content elements that are rendered on the canvas can include a widget. For example, a widget can be retrieved and executed to generate an interactive object, where each collaborator can interact with the interactive object to trigger functionality of the widget. The network computer system then propagates the detected changes in real-time (or near real-time) to a workspace file that corresponds to the collaborative medium or user interface. In real-time, the updates to the workspace file are transmitted to the computing devices of each of the collaborators in order to provide a real-time collaborative experience.

In some examples, a network computer system is provided to include memory resources that store a set of instructions, and one or more processors are operable to communicate the set of instructions to a plurality of user devices. The set of instructions can be communicated to user computing devices, in connection with the user computing devices being operated to render content for a particular application service on the collaborative medium. In examples, the content rendered with the collaborative medium can be edited by user input that is indicative of any one of multiple different input actions. As described by various examples, the instructions and data communicated to the computing devices enable the computing devices to select one of multiple collaborative application services to access, view, and edit rendered content on a corresponding collaborative medium.

Accordingly, examples as described enable users of an application service to interact with interactive elements such as widgets, in a manner that generates visual feedback on the collaborative medium that is rendered on the computing devices of the other collaborators. For example, certain types of input, such as pre-selection input (e.g., cursor hover) can cause the interactive element to change visual state or generate other visual feedback. As described by examples, the visual feedback generated by such input can be transmitted in real-time to the computing devices of other collaborators, such that the collaborative medium of all the users show the same object generating a corresponding visual feedback (e.g., highlight or other visual change responsive to pre-selection input). In this way, the state and/or appearance of interactive elements such as widgets can be accurately reflected on the collaborative mediums of the respective computing devices.

According to various implementations described herein, the network computer system and/or each of the user computing devices, tracks cursor movements and inputs on the collaborative medium by each of the collaborators and provides visual feedback based on the locations of each of the cursors and the inputs provided by each of the collaborators. In one example, when the collaborators provide inputs to create a widget (e.g., any interactive element on a given UI) the network computer system can establish a bounding area that encompasses the widget (e.g., traces the widget's boundaries), and generate feedback for future interactive states on the widget (e.g., hover-over, selection, focus, click, and any other user-action pseudo-classes). Thereafter, when any one of the collaborators interact with the widget, the network computer system propagates a real-time, designated feedback response to all other collaborators.

In certain examples, the network computer system can provide an application programming interface (API) that allows the collaborators to set and change the feedback response properties of a given widget's sublayers, such as widget fill (e.g., transparency level, color, etc.), stroke width (feedback boundary width), stroke color, and emphasis or text styling characteristics (e.g., resizing, underlining, bolding, or italicization). When the feedback response properties are configured, the network computer system can monitor inputs and cursor positions on the collaborative medium for each of the collaborators and provide the feedback response(s) to each of the collaborators when such inputs are performed on the widget, and when cursor positions are located within the bounding area of the widget.

As an example, during a collaboration session between multiple remote collaborators, a collaborative medium can be presented on the computing devices of each of the collaborators. The collaborative medium may have any number of widgets presented. In certain variations, each widget may have its own feedback response configuration (e.g., configured by one or more of the collaborators), or some or all of the widgets may have a common feedback response configuration (e.g., a default configuration established by the network computer system). Every user action performed on the widget by the collaborators (e.g., hover over actions, focus actions, activation actions, etc.) can cause a particular feedback response that the network computer system propagates to the collaborative medium displayed on each computing device of each collaborator in-real time. As a technical effect, the feedback responses for a given widget being presented to all collaborators in real-time can provide contextual information to all collaborators based on cursor position and user inputs. It is contemplated that propagation of widget feedback responses to all collaborators can provide greater interactivity between collaborators and enhance user experience.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for storing data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as smartphones and tablet computers) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
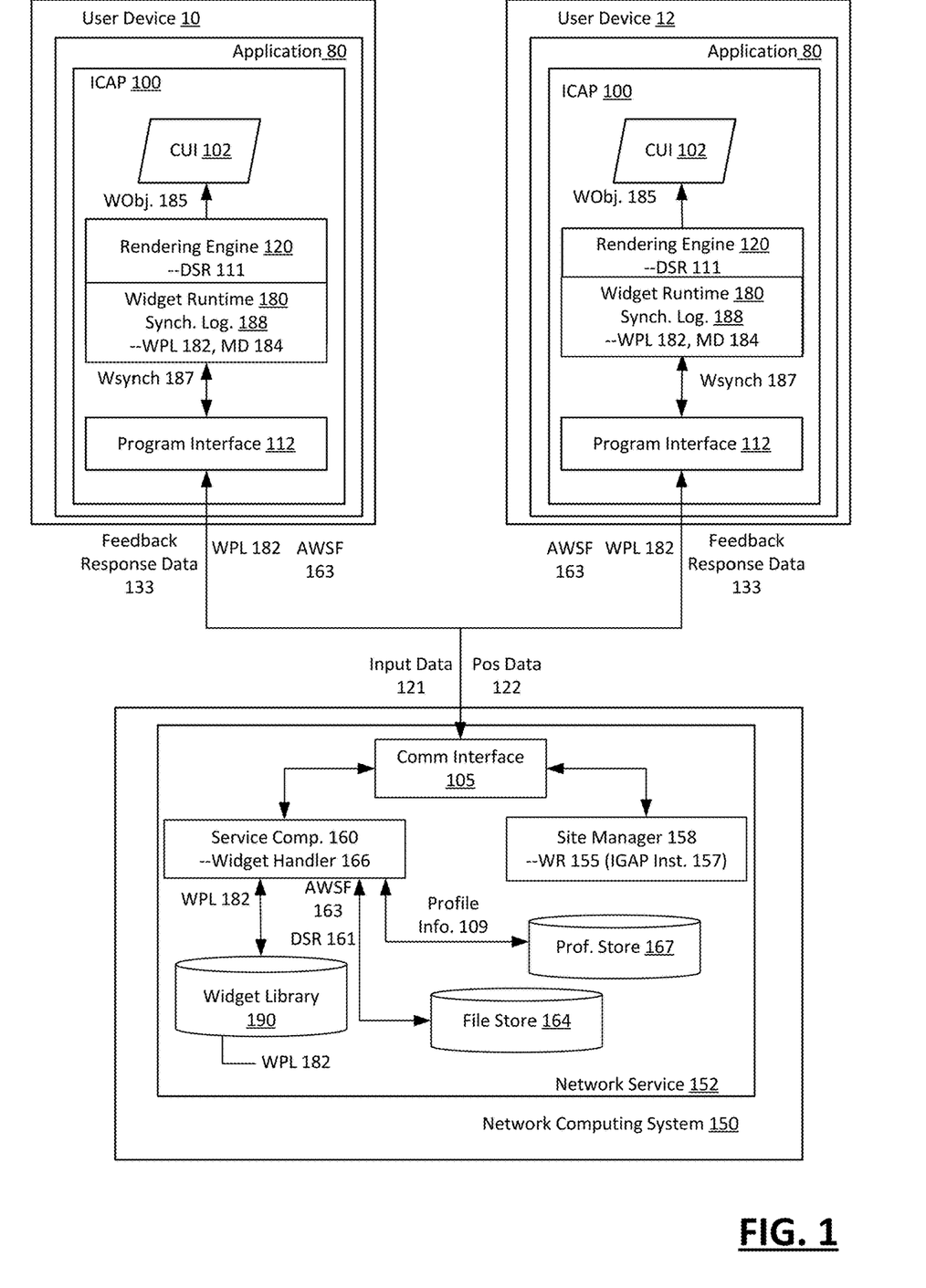
FIG. 1 illustrates a network computer system implementing an interactive and collaborative graphic design application platform on multiple user computing devices, according to one or more examples.

FIG. 1 illustrates a network computer system 150 to implement an interactive and collaborative application platform on multiple user computing devices 10, 12, according to one or more examples. A network computing system 150 such as described with an example of FIG. 1 can be implemented using one or more servers which communicate with user computing devices 10, 12 over one or more networks. In examples, the network computing system 150 performs operations to enable an interactive and collaborative application platform ("ICAP 100") to be implemented on user computing devices 10, 12. In examples, the ICAP 100 enables a user's computing device 10, 12 to utilize one or multiple different application services, where each application service provides collaborative application functionality for a shared application medium (e.g., canvas). In an example, ICAP 100 provides an application service to enable collaborators to create dynamic and interactive designs, including designs that can be prototyped or imported to a run-time environment. As an addition or variation, the ICAP can include a whiteboarding application service to enable collaborators to create visual content for purpose of sharing ideas and communicating about objectives. Accordingly, each application service provided through the ICAP 100 can provide functionality and configurations that is distinct from other application services.

According to examples, the ICAP 100 can be implemented on any number of user computing devices 10, 12 concurrently to enable individual collaborators to utilize one of multiple application services in a collaborative environment. Each application service can include resources and instructions to enable the collaborator to access, update, and/or create a corresponding workspace file. In particular, the ICAP 100 can generate a collaborative medium 102 on which the workspace file is rendered.

In further examples, the ICAP 100 executes on each user computing device 10, 12 as a multi-modal web-based platform, with each mode implementing one of multiple application services that are provided through the network computing system 150. The ICAP 100 can operate in either of multiple modes to render and update the workspace file on a collaborative medium using the application service of the mode in use.

According to examples, a user of each computing device 10, 12 operates a web-based application 80 to access a network site, where programmatic resources are retrieved and executed to implement the ICAP 100. The web-based application 80 can execute scripts, code, and/or other logic to implement functionality of the ICAP 100. In examples, the web-based application 80 can correspond to a commercially available browser, such as GOOGLE CHROME (developed by GOOGLE, INC.), SAFARI (developed by APPLE, INC.), INTERNET EXPLORER (developed by the MICROSOFT CORPORATION), etc. In such examples, the processes of the ICAP 100 can be implemented as scripts and/or other embedded code which web-based application 80 downloads from a network site. For example, the web-based application 80 can execute code that is embedded within a webpage to implement processes of the ICAP 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., a webpage structured in accordance with HTML 5.0 or other versions, as provided under standards published by W3C or WHATWG consortiums). In some examples, a rendering engine 120 executing on each user computing device 10, 12 may utilize graphics processing unit (GPU) accelerated logic, such as provided through WebGL (Web Graphics Library) programs which execute Graphics Library Shader Language (GLSL) programs that execute on GPUs.

The ICAP 100 can be implemented as part of a network service, where the web-based application 80 communicates with one or more remote computers (e.g., server used for a network service) to execute processes of the ICAP 100. The web-based application 80 retrieves some or all of the programmatic resources for implementing the ICAP 100 from a network site. The web-based application 80 may also access various types of data sets in providing the ICAP 100. The data sets can correspond to files, design libraries (e.g., predesigned design elements), and programmatic resources which can be stored remotely (e.g., on a server, in association with an account) or locally. In examples, the network computer system 150 provides a shared resource library which the user computing devices 10, 12 can use with either application service. In this way, the user may initiate a session to implement the ICAP 100 for purpose of creating or editing the workspace file, as rendered on the collaborative medium 102, in accordance with one of multiple application services of the ICAP 100.

In examples, the ICAP 100 includes a program interface 112 and a collaborative medium 102 that enables collaborators to interact with and make changes to, for example, a current document, interactive design, whiteboard, or other type of collaborative medium. The ICAP 100 can further include a rendering engine 120 that imparts the changes on the collaborative medium 102. The program interface 112 can include one or more processes which execute to access and retrieve programmatic resources from local and/or remote sources. In an implementation, the program interface 112 can generate the collaborative medium 102 using programmatic resources which are associated with the web-based application 80 (e.g., an HTML 5.0 canvas). As an addition or variation, the program interface 112 can trigger or otherwise cause the collaborative medium 102 to be generated using programmatic resources and data sets which are retrieved from local (e.g., memory) or remote sources (e.g., from network service).

The program interface 112 may also retrieve programmatic resources that include an application framework for use with the collaborative medium 102. The application framework can include data sets which define or configure a set of interactive graphic tools that integrate with the collaborative medium 102 and comprise the input interface to enable the user to provide input for creating, editing, and interacting with a particular design (e.g., UI design interface or whiteboard design).

According to some examples, the input interface can be implemented as a functional layer that is integrated with the collaborative medium 102 to detect and interpret user inputs. The input interface can use a reference of the collaborative medium 102 to dynamically determine a cursor position of the user and identify screen locations of user inputs (e.g., click inputs). Additionally, the input interface can interpret input actions of the user based on the location of the detected input (e.g., whether the position of the input indicates selection of a tool, an object rendered on the collaborative medium 102, or a region of the collaborative medium 102), the frequency of the detected input in a given time period (e.g., double-clicks), and/or the start and end position of an input or series of inputs (e.g., start and end positions of click and drag inputs), as well as various other input types which the user can specify (e.g., right-click, screen-tap, etc.) through one or more input devices. In this manner, the input interface can interpret a series of inputs as a design tool selection (e.g., shape selection based on location of input), as well as inputs to define attributes (e.g., dimensions) of a selected shape. In examples, the different types of inputs which can be received can include interactive input that generates a visual feedback, such as pre-selection input that generates a visual state change of a corresponding widget.

In some examples, the ICAP 100 includes instructions that enable the user computing devices 10, 12 to utilize multiple application services at one time, in connection with the user computing devices 10, 12 accessing, updating, and/or creating a workspace file on a collaborative medium. In examples, each workspace file can be associated with a particular application service, and by default, a computing device that opens the workspace file utilizes the default application service to access and update the workspace file. The user may also switch modes on the ICAP 100 to utilize another application service to update the workspace file.

The network computing system 150 can include a site manager 158 to manage a website where a set of web-resources 155 (e.g., web page) are made available for the web-based application 80 executed by the user computing devices 10, 12. The web-resources 155 can include instructions, such as scripts or other logic ("ICAP instructions 157"), which are executable by browsers or web components of the user computing devices 10, 12. The web resources 155 can also include (i) shared resources provided to the user computing devices 10, 12 in connection with the user computing devices 10, 12 utilizing either of the application services, and (ii) application specific resources the execute on the user computing devices 10, 12 for a particular one of the available application services. In some examples, the web resources 155 include a shared library of user-interactive elements, which enable the user to select predetermined elements for use on the collaborative medium 102 in connection with the application services.

In some variations, when the computing devices 10, 12 access and download the web-resources 155, the web-based application 80 executes the ICAP instructions 157 to implement functionality as described with examples herein. For example, the ICAP instructions 157 can be executed by the web-based application 80 to initiate the program interface 112 on the user computing device 10. The initiation of the program interface 112 may coincide with the establishment of a web-socket connection between the program interface 112 and a service component 160 of the network computing system 150.

In some examples, the web-resources 155 include logic that the web-based application 80 executes to initiate one or more processes of the program interface 112, causing the ICAP 100 to retrieve additional programmatic resources and data sets for implementing functionality as described by examples herein. The web resources 155 can, for example, embed logic (e.g., JAVASCRIPT code), including GPU accelerated logic, in an HTLM page for download by the computing devices 10, 12 of the collaborators. The program interface 112 can be triggered to retrieve additional programmatic resources and data sets from the network service 152 and/or from local resources of the computing device 10, 12 in order to implement each of the multiple applications of the ICAP 100. For example, some of the components of the ICAP 100 can be implemented through webpages that can be downloaded onto the computing device 10, 12 after authentication is performed, and/or once the user performs additional actions (e.g., downloads one or more pages of a workspace). Accordingly, in examples described, the network computing system 150 can communicate the ICAP instructions 157 to the computing devices 10, 12 through a combination of network communications, including through downloading activity of the web-based application 80, where the ICAP instructions 157 are received and executed by the web-based application 80.

The computing devices 10, 12 can use the web-based application 80 to access a website of the network service 152 to download the webpage or web resource. Upon accessing the website, web-based application 80 can, automatically (e.g., through saved credentials) or through manual input, communicate an account identifier to the service component 160. In some examples, the web-based application 80 can also communicate one or more additional identifiers that correlate to a user identifier of a particular collaborator.

Additionally, in some examples, the service component 160 can use the user or account identifier of a particular collaborator to retrieve profile information 109 from a user profile store 167 of the network computing system 150. As an addition or variation, profile information 109 for the user can be determined and stored locally on the user's computing device 10, 12.

The service component 160 can also retrieve the files of an active workspace ("active workspace files 163") that are linked to the user account or identifier of the collaborator from a file store 164 of the network computing system 150. The profile store 167 can also identify the workspace that is identified with the account and/or user, and the file store 164 can store the data sets that comprise the workspace. The data sets stored with the file store 164 can include, for example, the pages of a workspace and one or more data structure representations 161, which is rendered by the rendering engine 120 from the respective active workspace files 163. As an addition or variation, each file 163 can be associated with metadata that identifies the application that was used to create and/or render the particular file 163.

Additionally, in examples, the service component 160 provides a representation of the workspace associated with the user to the web-based application 80, where the representation identifies individual files associated with the user and/or user account. The workspace representation can also identify a set of files, where each file includes one or multiple pages, and each page includes objects that are part of a collaborative medium 102.

On the user computing device 10, 12, the collaborator can view the workspace representation through web-based application 80, and the collaborators can elect to open a file 163 of the workspace through the web-based application 80. In examples, upon the collaborators electing to open one of the active workspace files 163, the web-based application 80 initiates the multi-user canvas 102. For example, the ICAP 100 can initiate an HTML 5.0 canvas as a component of the web-based application 80, and the rendering engine 120 can access one or more data structures representations 111 of a UI interface to render the selected workspace file on the collaborative medium 102.

In examples, the ICAP 100 can be implemented to execute with multiple modes of operation, where each mode corresponds to one of the application services provided by the network computer system 150. The program interface 112 can also include alternative modes of operation. For example, the application framework and input interface for the collaborative medium 102 can differ in form, function, or configuration as between the alternative modes of the ICAP 100. The set of interactive tools provided by the program interface 112 can differ based on the application service which the workspace file is associated with. Additionally, the type of actions the user or collaborator can perform to register inputs can vary based on the alternative modes of the program interface 112. Still further, the different modes of the program interface 112 can include different input features or user-interface features for the user to select and use for inclusion on the collaborative medium 102. By way of example, when the ICAP 100 is operating in a mode for a whiteboarding design service application, the program interface 112 can provide input features to enable a user to select a design element that is in the form of a "sticky note," while in an alternative mode for an interactive graphic design service application, the "sticky note feature" is not available. However, in the alternative mode, the user may be able to select any one of numerous possible shapes or previously designed objects in which the user can write textual messages for display on the collaborative medium 102.

Still further, the rendering engine 120 can include logic to enable alternative behaviors for different modes of operation, based on the design service application that is in use. By way of example, the rendering engine 120 can implement mode-specific logic to vary, based on the mode of operation, the behavior of objects that are selected, the manner in which objects can be resized or moved, as well as the manner in which objects are rendered on the collaborative medium 102.

Widgets and Interactive Elements

Additionally, each of the application services can utilize a shared library of interactive elements, as well as core functionality that enables interactive elements to be shared and updated between the different application services that are available through the platform. Additionally, the file type (e.g., workspace file) created and edited through use of one application service can be utilized with other application services. Moreover, the transition between application services can be seamless—for example, the user computing device 10, 12 can open a workspace file 163 using a first application service (e.g., interactive graphic application service for UIX design), then seamlessly switch to using a second application service (e.g., whiteboarding application service) with the same workspace file 163 without closing the workspace file 163. In such an example, each application service enables the user to update the workspace file 163 even while the workspace file 163 is in use in a collaborative environment, as shown in FIG. 1. In such examples, the user can mode-switch the ICAP 100 to switch the application service used with the workspace file 163.

In examples, the ICAP 100 is operable on the user computing device 10, 12 to selectively implement widgets with one or more application services. The ICAP 100 can include a widget runtime component 180 that executes as part of the rendering engine 120 to implement selected widgets on the computing device 10, 12. As provided herein, a widget can include a program or combination of programs executable to provide functionality that integrates with the ICAP 100 on the user computing device 10, 12. However, while a widget is designed to be integrated with the ICAP 100, a widget may be provided by a third-party source separate from the source of the ICAP 100.

In various examples, a widget may be associated with resources provided by a third-party (e.g., a party other than the developer of the ICAP 100). The widget resources can reside on the network computing system 150, such as with a widget library 190. The resources of each widget can include data, scripts, code, and/or other programming, collectively termed widget programming logic ("WPL") 182, for implementing the widget on user computing device 10. For a given widget, the WPL 182 can include transactional and distributive logic that is communicated to the user computing device 10, 12 in response to one or more events (e.g., user interactions), and executed by the widget runtime component 180 of the rendering engine 120 in response to the events. In examples, the WPL 182 includes logic that is initially provided by the network computing system 150 to implement the widget, and logic that is embedded with the collaborative medium 102 to be triggerable through user interactions and/or other events that may occur with respect to the collaborative medium 102.

Accordingly, the WPL 182 may include separate sets of programming, script and data, which are communicated to the user computing device 10, 12 at different times, such as at an initial time when the widget is first implemented with the collaborative medium 102 (e.g., canvas), and after each instance in which the user interacts with the widget. In some examples, the WPL 182 can be initially communicated to the widget runtime component 180 from the network computer system 150. The WPL 182 can also be copied and stored in cache or with other local resources, such that in subsequent instances, the widget runtime component 180 retrieves the WPL 182 from the local resource, rather than from the network computer system 150. In the context of various examples described, reference to "widget programming logic" or "WPL 182" is intended to include scenarios where the WPL 182 that is transmitted or executed at a particular instance represents a portion of the total executable logic that exists for a particular widget, where the total executable logic defines the overall functionality of the widget. In examples described herein, the ICAP 100 implements a widget, or component of the widget, when the rendering engine 120 executes WPL 182 for the widget.

According to various examples, the network computing system 150 can provide a widget library 190 that enables the ICAP 100 to access to a collection of widgets for use in designing a particular UI. For example, the widget library 190 can be provided as part of the network service 152 in the form of a widget marketplace or collection from which a user can search and make selections of individual widgets for use with the collaborative medium 102. In such examples, widgets can be selectively executed with the ICAP 100 to provide, for example, an interactive feature that is persistent with the collaborative medium 102. The user can search or otherwise interact with the widget library 190 to select a particular widget. For example, the user can perform a search of the widget library 190 to identify a selected widget. In variations, widgets can be provided from third-party sites or resources. Still further, in some variations, the program interface 112 can access an online widget store or network database to enable the user computing devices 10, 12 to access and use widgets.

The widget library 190 can include the WPL 182 for any one of multiple widgets that are available to the user computing devices 10, 12. In variations, the widget library 190 can include a reference or pointer to the WPL 182 and/or other resources of a given widget. The widget runtime component 180 can then use the pointers to retrieve the WPL 182 from other network sources.

Each user of the computing devices 10, 12 can select to implement a particular widget on a given collaborative medium 102. When the user selects to launch a particular widget on the collaborative medium 102, a widget handler 166 executes on the network computing system 150 to access the widget resources of the selected widget, and to transmit the WPL 182 corresponding to the selected widget to the ICAP 100 to initiate the widget on the collaborative medium 102. The widget runtime component 180 receives and executes the WPL 182 to generate a widget object 185 as part of a design provided on the collaborative medium 102. In this way, the widget object 185 can overlay a portion of the collaborative medium 102 and form a persistent feature of the workspace file. In examples, various operations can be performed with respect to the collaborative medium 102 and the widget rendering without triggering the use of WPL 182. For example, the rendering engine 120 can operate to resize or reposition the widget object 185, based on corresponding user inputs directed to manipulating the widget object 185 as an object on the collaborative medium 102. As an additional example, the collaborative medium 102 can be closed and then opened to include the widget object 185 rendering without executing any WPL 182 for the widget. In this way, the widget object 185 can reside with the collaborative medium 102 as part of an existing design, subject to the rules and logic of the rendering engine 120. However, input directed to an interactive aspect of the widget (e.g., input that triggers a selectable or active feature within the frame of the widget object 185) can trigger execution of widget-specific programming logic, which in turn can change a state of the widget object 185.

In various implementations, the rendering engine 120 includes a widget runtime component 180 to execute the WPL 182 of a selected widget. The widget runtime component 180 operates to selectively execute the WPL 182 for a widget that is launched for use with the collaborative medium 102. Among other tasks, the widget runtime component 180 can operate to detect user inputs intended to be a widget interaction, retrieve the WPL 182 corresponding to the widget from a network or local resource based on the detected user input, and execute the retrieved WPL 182 to generate and/or modify the widget object 185. In examples, multiple instances of the widget runtime component 180 can be initiated to perform tasks for multiple widgets that are selectively implemented on the collaborative medium 102.

In certain examples, the implemented widget can be associated with a metadata set 184, where the metadata set identifies a state of the widget object 185. In variations, multiple widget objects or renderings are generated by execution of the WPL 182 for a particular widget, and each widget object 185 is associated with a corresponding set of metadata 184 that represents the state of the corresponding widget object 185 or rendering. Still further, in other variations, the state of the implemented widget can reflect a state or outcome of an action performed by the implemented widget.

The widget runtime component 180 can detect widget inputs that are intended to be interactive with the widget object 185. For example, the widget runtime component 180 can detect inputs that overlay an interior of a widget object that is rendered on the collaborative medium 102. The widget runtime component 180 can capture the widget input, retrieve the WPL 182 from the widget handler 166, or from a local source, as described with examples herein. In some examples, the retrieved WPL 182 is based on the widget input. The widget runtime component 180 executes the retrieved WPL 182 to modify the widget object 185 to reflect the user input. Thus, the widget runtime component 180 can operate to retrieve and execute the WPL 182 as a response to a user interaction with the widget object.

By way of example, the widget object 185 can be an interactive object that includes a frame or boundary, with one or more interactive features provided within the frame. The widget runtime component 180 can further be configured to be responsive to different types of input, such as pre-selection input (e.g., hover) or selection input. Such inputs can cause the widget object 185 to visually change state. For example, the widget object 185 can be resized, moved, or have other attributes altered by the rendering engine 120. Additionally, the widget object 185 can be configured to execute a set of operations or function, corresponding to, for example, a primary function of the widget object 185, as a response to other types of user input (e.g., selection input). In such examples, the execution of the WPL 182 can modify the state of the widget object 185, and the metadata set 184 associated with the widget object 185 can be updated to reflect the updated state of the widget object 185.

As a collaborative platform, the network computing system 150 can communicate with multiple user computing devices 10, 12 over the one or more networks to implement the ICAP 100 on each computing device 10, 12. While FIG. 1 illustrates an example in which two users utilize the collaborative network platform, examples as described allow for the network computing system 150 to enable collaboration on interfaces amongst a larger group of users.

In some examples, the user computing devices 10, 12 can be operated by users that are associated with a common account, with each user computing device 10, 12 implementing a corresponding ICAP 100 to access the same workspace during sessions that overlap with one another. Accordingly, each of the user computing devices 10, 12 may access the same set of active workspace files 163 at the same time, with the respective program interface 112 of the ICAP 100 on each user computing device 10, 12 operating to establish a corresponding communication channel (e.g., web socket connection) with the service component 160.

The service component 160 can communicate a copy of the active workspace files 163 to each user computing device 10, 12, such that the computing devices 10, 12 render an active workspace file 163 on a collaborative medium 102 at the same time. In some examples, an active workspace file 163 can be associated with a default application service, and each computing device 10, 12 can open the active workspace file 163 using the associated (or default) application service. Each of the computing devices 10, 12 can maintain a local data structure representation 111 of the selected workspace file 163. The service component 160 can also maintain a network-side data structure representation 161 obtained from the active workspace file 163, coinciding with the local data structure representations 111 on each of the computing devices 10, 12. In some examples, the users of the computing devices 10, 12 can switch the operational mode of the ICAP 100 to view and update the workspace using a non-default application service. Thus, in some variations, the active workspace file 163 can be updated by the users utilizing any of the application services.

By way of example, during a collaboration session, users can collaboratively view and edit the workspace file 163 using either an application service or a whiteboarding application service. The network computer system 150 can detect changes made by users that utilize either of the application service or whiteboarding application service, and the network computer system 150 can propagate detected changes made on any one of the user computing devices 10, 12 to the other user computing devices 10, 12. Further, individual users that participate in the collaborative environment can download and open the workspace file using a default application service (e.g., whiteboarding application service), then switch to the other application service without closing the workspace file 163.

In some examples, the web resources 155 which are available with a given workspace file 163 can include a design library of design elements which may be made available to one or both of the application services. Still further, in examples, the design application library can be updated by users using either of the application services. Moreover, in some variations, changes made by individual users to design elements of the design library can be propagated to instances of the design library provided to other user computing devices (e.g., such as users of a collaborative session), and/or the design interfaces rendered on the local canvas or collaborative medium 102 of other users which utilize the particular design element.

To illustrate the latter variation, a user participating in a collaborative session can update a design element used in connection with an active workspace file 163 of a collaborative session. Further, in variations, the user can update the design element using either of the application services. If the design element is in use on the collaborative medium 102 that is shared during the collaborative session, the change to the design element as stored with the design library can be automatically detected by the network computer system 150, and the change can be propagated to each design library that is downloaded to the user computing devices 10, 12, as well as the design element as rendered on the collaborative medium 102 (or canvas) of the individual users of the collaborative session.

The network computing system 150 can continuously synchronize the active workspace files 163 on each of the user computing devices 10, 12. In particular, changes made by users to a selected active workspace file 163 on one computing device 10, 12 may be immediately reflected in the respective data structure representation 161 of the workspace file, and (rendered on the other user computing devices 10, 12. By way of example, the user of computing device 10 can make a change to the respective workspace file 163 as rendered on the collaborative medium 102, and the respective rendering engine 120 can implement an update that is reflected in the local copy of the data structure representation 111. From the computing device 10, the program interface 112 of the ICAP 100 can stream change data, reflecting the change corresponding to the user input, to the service component 160. The service component 160 processes the change data of the user computing device 10. The service component 160 can use the change data to make a corresponding change to the network-side data structure representation 161. The service component 160 can also stream remotely generated change data (which in the example provided, corresponds to or reflects the change data received from the user computing device 10) to the other user computing device 12 to cause the corresponding ICAP 100 to update the workspace file 163 as rendered on the other device 10. The computing device 12 may also use the remotely generated change data to update with the local data structure representation 111 of that computing device 12. The program interface 112 of the computing device 12 can receive the update from the network computing system 150, and the rendering engine 120 can update the workspace file and the respective local copy of 111 of the computing device 12.

The reverse process can also be implemented to update the data structure representations 161 of the network computing system 150 using change data communicated from the second computing device 12 (e.g., corresponding to the user of the second computing device 12 updating the workspace file 163 as rendered on the second computing device 12). In turn, the network computing system 150 can stream remotely generated change data (which in the example provided, corresponds to or reflects change data received from the user device 12) to update the local data structure representation 111 of the workspace file on the first computing device 10. In this way, the workspace file 163 of the first computing device 10 can be updated as a response to the user of the second computing device 12 providing user input to change the workspace file 163.

To facilitate the synchronization of the data structure representations 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163 to restart the maintenance of the data structure representation 111 of the workspace file 163 that is rendered and edited on that device.

With reference to FIG. 1, the widget runtime component 180 includes logic to synchronize implementation of the widget amongst any number of computing devices that share the multi-user canvas 102 in a collaboration session.

Any user of the user computing devices 10, 12 can initiate a particular widget for the collaborative session. The input of the initiating user can launch the widget for the collaborative medium 102 that is being shared. The widget runtime component 180 retrieves and executes the WPL 182 from the widget handler 166 to generate a widget object 185 on the collaborative medium 102, and determines a metadata set 184 that represents the state of the widget object 185. The widget runtime component 180 can include synchronization logic 188 to generate and stream widget synchronization data 187 to the other collaborating computing devices 10, 12. The widget synchronization data 187 can include data that identifies an update to the widget rendering, and data that identifies an update to the metadata set 184 associated with the widget object 185. Thus, for example, the widget synchronization data 187 can include data that reflects a change to the visual state of a rendered widget or object, such as in the case of pre-selection or feedback input (e.g., hover, etc.), where position input associated with the input can cause the widget object to change visual states. The widget synchronization data 187 can be received by the service component 160, and restreamed to the other computing devices 10, 12 that share the same collaborative medium 102.

On each of the other respective computing devices 10, 12, the widget runtime component 180 executes the synchronization logic 188 to receive and act on the widget synchronization data 187. In particular, the widget runtime component 180 can execute the synchronization logic 188 to generate and/or update the widget object 185 and the associated metadata set 184. In this way, the widget object 185 is rendered as part of the collaborative medium 102 on each collaborating user computing device 10, 12, with each computing device 10, 12 further associating a common metadata set 184 with the widget object 185. The widget object 185 can further remain as a persistent feature of the collaborative medium 102 or the design under edit 125. Moreover, as a persistent feature, the interactive widget object 185 can remain as part of the collaborative medium 102 and can be available for use to computing devices 10, 12 that operate in alternative modes and/or use different application services (e.g., whiteboard application versus design interface) to render and update the content presented on the collaborative medium 102. The widget object 185 can further be rendered to reflect changes to the visual state, resulting from input (e.g., pre-selection input, feedback, etc.) caused by the pointer (or cursor) positioning and movement of one or more other users of the collaborative session.

The widget runtime component 180 on each computing device 10, 12 can subsequently operate to detect widget inputs, and in response, retrieve the relevant WPL 182 based on the detected user inputs. Thus, the WPL 182 for the implemented widget is retrieved and executed responsively to the user interactions. Further, in examples, only the computing device 10, 12 on which widget input is received executes the WPL 182 to modify the widget object 185 and update the metadata set 184 to reflect a change in the state of the widget object 185. The widget runtime component 180 utilizes synchronization logic 188 to stream the updated widget object 185 and metadata set 184 (or the changes to the widget object 185 and/or metadata set 184) to the other computing device 10, 12. In this way, examples provide for the WPL 182 to be executed on the computing device 10, 12 where widget input is received, with synchronization operations being used to update the widget object 185 and metadata set 184 on the other computing devices 10, 12.

According to examples provided herein, execution of the synchronization logic 188 can render additional user action features on the collaborative medium 102, such that each collaborator in a collaborative session can view a labeled or unique cursor position of each other collaborator. For example, each cursor of each collaborator may be associated with a unique color and/or may be labeled with a username of that collaborator. Position data 122 corresponding to the location of each collaborator's cursor position on the collaborative medium 102 can be streamed to a communication interface 105 of the network computing system 150 and dynamically tracked (e.g., by the service component 160) during the collaborative session. As provided herein, the cursor position can correspond to mouse movements performed by a user on the collaborative medium 102, or touch-scroll inputs performed by a user on a touch-sensitive computing device.

Based on the streamed position data 122 from each user computing device 10, 12, the service component 160 can dynamically propagate a visual state change or other feedback resulting from cursor movement on the collaborative medium 102 such that each user computing device 10, 12 presents real-time cursor movements of each collaborator. In the context of interactive widgets, a cursor position that overlaps a bounding area of a particular widget rendered on the collaborative medium 102 can cause the widget to provide a feedback response in accordance with the WPL 182 of the widget. As described above, the collaborators may make changes to the widget size, interactive characteristics of the widget, and the manner in which the widget provides feedback responses to different user interactions, such as hover-over actions, focus actions (e.g., select and hold), and active actions (e.g., a click action).

In accordance with examples described, the feedback responses to widget object(s) 185 rendered on the collaborative medium 102 can be reflected on each of the user computing devices 10, 12. In accordance with the WPL 182 of a particular widget, the feedback responses may comprise a fill response (e.g., the widget is highlighted or filled in with a particular color having a particular level of transparency or translucence when a particular user action occurs, such as a hover-over or mouse-over action on the widget), a stroke response (e.g., an outline or boundary of the widget is highlighted or changes color with a particular boundary width when a particular user action occurs, such as a selection or click action), a size change of the widget, the appearance of an additional UI element, and the like. Furthermore, feedback responses may overlap or can be layered when a widget object 185 includes nested responses in which, for example, a button is located within another widget. In further examples described herein, multiple collaborators may interact with the same widget object 185 (e.g., hover over the same widget object with their respective cursors), which can cause a single feedback response propagated to all user computing devices 10, 12, or layered feedback responses being propagated to all user computing devices 10, 12 (e.g., a darkening of the fill or stroke response for every additional hover-over).

During a collaborative session, the position data 122 of a cursor or input interface feature for each user computing device 10, 12 can be tracked by the service component 160, which can continuously update the position of each cursor or input interface feature rendered on the collaborative medium 102 presented on each of the computing devices 10, 12. When a particular cursor or input interface feature interacts with a widget object 185, as determined from the position data 122, the service component 160 can transmit feedback response data 133 to the rendering engine 120 executing on each of the user computing devices 10, 12 to cause the feedback response of the particular widget object 185 to be presented on the collaborative medium 102 displayed on each of the user computing devices 10, 12.

The service component 160 can further process input data 121, corresponding to user inputs on widget object(s) presented on the collaborative medium 102. Such inputs can comprise focus or active inputs that select the widget object 185 or can comprise actions that adjust or update the widget object 185. The WPL 182 for the widget object 185 can determine the feedback responses for such inputs, and the service component 160 can propagate the feedback responses to each user computing device 10, 12 by transmitting feedback response data 133 accordingly. Thus, the collaborative medium 102 presented on each user computing device 10, 12 can be continuously updated to provide feedback responses based on user actions performed on widget objects 185 by each and any of the collaborators.

In some examples, the WPL 182 for a displayed widget object 185 can include a feedback hierarchy for multi-user interactions on the widget. For example, an input feedback response (e.g., a fill-in of the widget based on a collaborator selecting the widget) may be associated with a higher priority than a hover-over feedback response. In such an example, the service component 160 identifies multiple, simultaneous interactions with the widget, and propagates the highest hierarchical feedback response to the computing devices 10, 12. In further implementations, the WPL 182 may indicate non-conflicting feedback responses in which multiple feedback responses may be presented simultaneously, such as a first collaborator hovering or otherwise indicating a pre-selection input over the widget object 185, so as to cause a stroke feedback response while a second collaborator selects the widget object 185 causing a fill feedback response. In such an example, the service component 160 can detect these simultaneous interactions and propagate all non-conflicting feedback responses accordingly.

As provided herein, nested layered widget objects can provide multiple feedback responses on the collaborative medium 102 depending on the nature of the interactions and the number of simultaneous interactions. When the service component 160 detects multiple interactions on a layered widget (e.g., a widget within a larger widget), the service component 160 can propagate each feedback response for the layered widget object 185 to the user computing devices 10, 12 in accordance with the WPL 182 of the nested widget object 185, as described in further detailed below with respect to FIG. 3C.

Methodology

Figure 2:
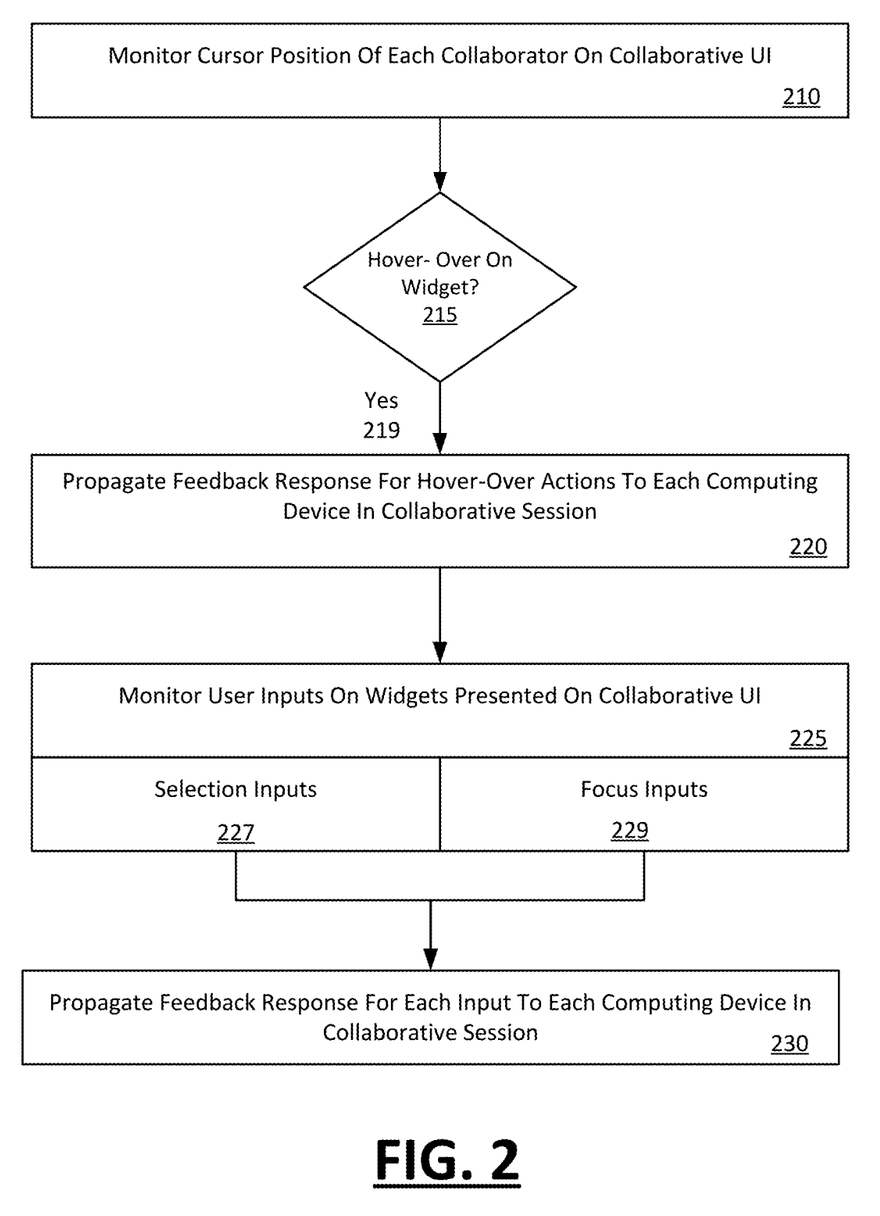
FIG. 2 illustrates an example method of tracking cursor positions and inputs and propagating feedback responses to computing devices of collaborators, according to one or more embodiments.

FIG. 2 illustrates an example method of tracking cursor positions and inputs and propagating feedback responses to computing devices of collaborators, according to one or more embodiments. In the below discussion of FIG. 2, reference may be made to reference characters representing like features as shown and described with respect to FIG. 1. Furthermore, the processed described with respect to FIG. 2, may be performed by an example network computing system 150 as shown and described with respect to FIG. 1. Referring to FIG. 2, the computing system 100 can monitor cursor positions (or other input feature) of each participating collaborator on a collaborative medium 102 (210). The network computing system 150 can continuously determine whether any of the cursor positions hover-over or mouse-over a widget object (215). When the computing system 150 detects a cursor position within a bounding area of a widget object (219), the computing system 150 propagate a feedback response for hover-over actions to each user computing device 10, 12 in the collaborative session (220).

As provided herein, the feedback response for hover-over or mouse over actions on a widget object can be a default response or can be determined from the WPL 182 of the widget object 185. Furthermore, when multiple cursors are within the bounding area of the widget object 185, the network computing system 150 can maintain the feedback response until a last widget object exits the bounding area. In variations, the network computing system 150 can cause the feedback response on the widget object 185 to alter or increase in intensity or tone for each additional cursor entering the bounding area of the widget.

The network computing system 150 can further monitor user inputs by the collaborators performed on each presented widget object 185 of the collaborative medium 102 (225). Such input can comprise any pseudo class user actions, such as active (e.g., selection inputs (227), focus, focus-visible, or focus-within actions (229)). Based on each user input, the network computing system 150 can propagate the designated feedback response for the input to all user computing devices 10, 12 in the collaborative session (230). Thus, the network computing system 150 provides real-time feedback to all collaborators providing user actions on widgets presented on a collaborative medium 102. Such feedback is contemplated to enhance the collaborative experience, making collaboration sessions more interactive and efficient between collaborators.

It is further contemplated that the feedback responses can be provided hierarchically when multiple user actions occur on a single widget object 185. For example, multiple cursors may be positioned with the bounding area of a single widget object 185, which can cause the widget to provide a stroke response (e.g., an outline of the widget can be highlighted). When one of the collaborators provides a selection input while a second collaborator maintains a hover-over state on the widget, the feedback hierarchy can mandate that the stroke response be canceled and a fill response be provided so long as the selection input is active. In variations, two separate feedback responses may be active simultaneously (e.g., simultaneous stroke and fill responses on a single widget) based on the user interactions of the collaborators on the single widget.

Widget Feedback Response Examples

Figure 3A:
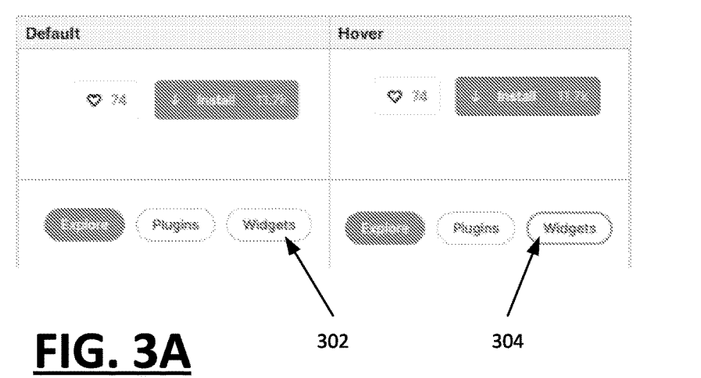
FIGS. 3A through 3C illustrates example real-time feedback responses propagated to each user computing device for widgets presented on a multi-user canvas, according to one or more embodiments.
Figure 3B:
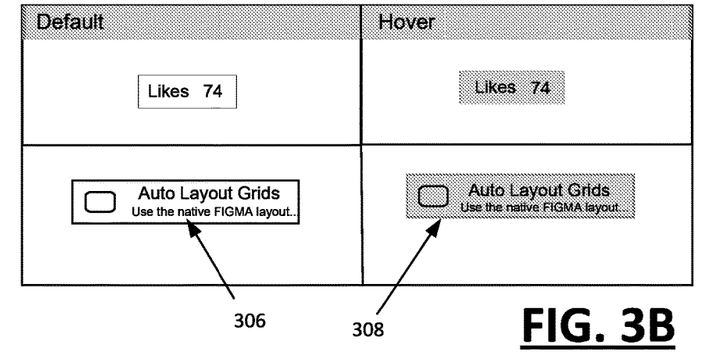
Figure 3C:
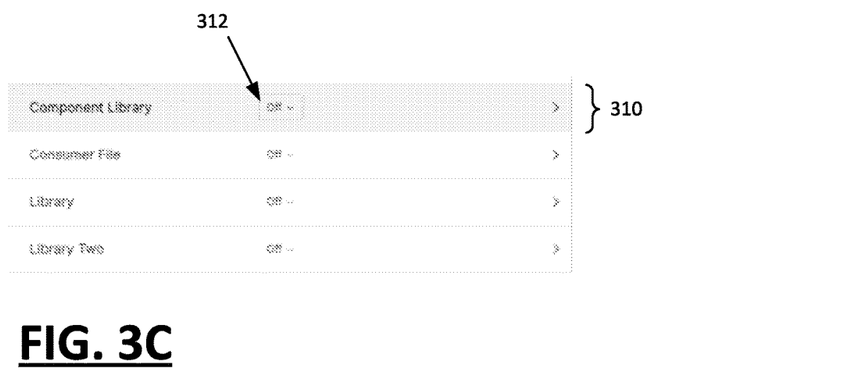

FIGS. 3A through 3C illustrates example real-time feedback responses propagated to each user computing device 10, 12 for widgets that are available for a collaborative medium 102, according to one or more embodiments. For each feedback response example, a user action can be performed with respect to a corresponding widget object (e.g., a hover-over action, pre-selection input, selection action, focus action, etc.) and propagated by the network computing system 150 to all user computing devices 10, 12 participating in the collaborative session. FIG. 3A shows an example of an inactivated widget 302 with no feedback response enabled (e.g., no actions are performed on the corresponding widget object), and the same activated widget 304 when one or more of the collaborators provides a hover-over action on the corresponding widget object. The feedback response comprises a stroke response in which the boundary of the widget 304 is highlighted. The network computing system 150 can identify that a cursor position of one of more of the collaborators has entered a bounding area of the widget 304, and propagates the corresponding feedback response for the widget to all other user computing devices 10, 12 accordingly.

FIG. 3B shows an inactivated widget 306 and the same widget 308 providing a feedback response when one or more of the collaborators provide a hover-over action on the widget 308. The feedback response comprises a fill response in which the entire widget is filled in with a particular color having a certain transparency level. Again, the network computing system 150 identifies that a cursor position of one of more of the collaborators has entered a bounding area of the widget 308, and propagates the corresponding feedback response for the widget to all other user computing devices 10, 12 accordingly.

FIG. 3C shows a layered widget 312 within an underlying widget 310 that provides nested feedback to the collaborators. Multiple feedback responses may be propagated for such layered widgets 310, 312 when single or multiple user actions are detected. For example, a hover-over action on widget 310 but not within the bounding area of widget 312 can cause both a fill response to occur on the entire bounding area of widget 310 (as shown) and a stroke response to occur on the inner widget 312. In this example, when a cursor position is also detected within the bounding area of widget 312, an additional feedback response may be propagated for widget 312 (e.g., an additional fill response). Furthermore, when additional user actions occur on the nested widget while widget 310 is filled, such as a selection input or focus input, the network computing system 150 can propagate the designated feedback response for the additional user actions to all user computing devices 10, 12 in real-time. Accordingly, multiple feedback responses may be propagated for single widgets based on multiple user actions performed on the widget, and with layered widgets when multiple user actions occur on any one or more of the bounding areas of the layered widgets.

Network Computer System

Figure 4:
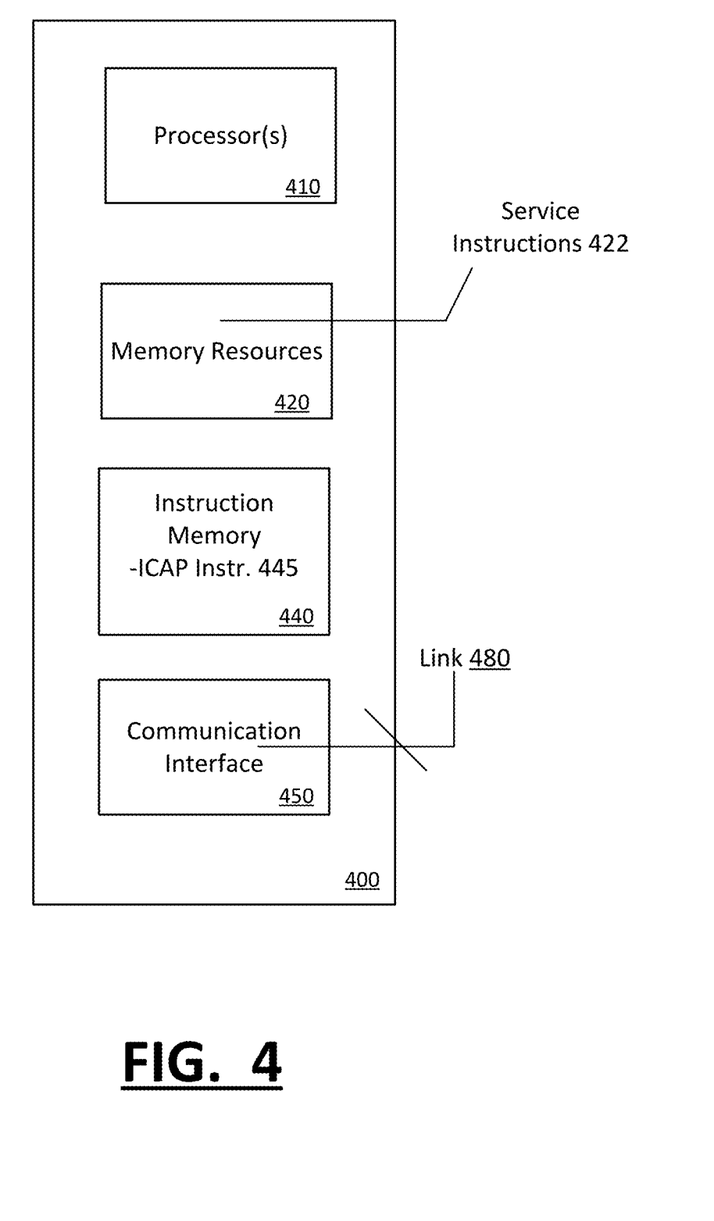
FIG. 4 illustrates a computer system on which one or more embodiments described herein can be implemented.

FIG. 4 illustrates a computer system on which one or more embodiments can be implemented. A computer system 400 can be implemented on, for example, a server or combination of servers. For example, the computer system 400 may be implemented as the network computing system 150 of FIG. 1.

In one implementation, the computer system 400 includes processing resources 410, memory resources 420 (e.g., read-only memory (ROM) or random-access memory (RAM)), one or more instruction memory resources 440, and a communication interface 450. The computer system 400 includes at least one processor 410 for processing information stored with the memory resources 420, such as provided by a random-access memory (RAM) or other dynamic storage device, for storing information and instructions which are executable by the processor 410. The memory resources 420 may also be used to store temporary variables or other intermediate information during execution of instructions to be executed by the processor 410.

The communication interface 450 enables the computer system 400 to communicate with one or more user computing devices, over one or more networks (e.g., cellular network) through use of the network link 480 (wireless or a wire). Using the network link 480, the computer system 400 can communicate with one or more computing devices, specialized devices and modules, and/or one or more servers.

In examples, the processor 410 may execute service instructions 422, stored with the memory resources 420, in order to enable the network computing system to implement the network service 152 and operate as the network computing system 150 in examples such as described with FIG. 1.

The computer system 400 may also include additional memory resources ("instruction memory 440") for storing executable instruction sets ("ICAP instructions 445") which are embedded with web-pages and other web resources, to enable user computing devices to implement functionality such as described with the ICAP 100. In examples, the computer system 400 can communicate the ICAP instructions 445 to computing devices of collaborators during a collaboration session.

As such, examples described herein are related to the use of the computer system 400 for implementing the techniques described herein. According to an aspect, techniques are performed by the computer system 400 in response to the processor 410 executing one or more sequences of one or more instructions contained in the memory 420. Such instructions may be read into the memory 420 from another machine-readable medium. Execution of the sequences of instructions contained in the memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 5:
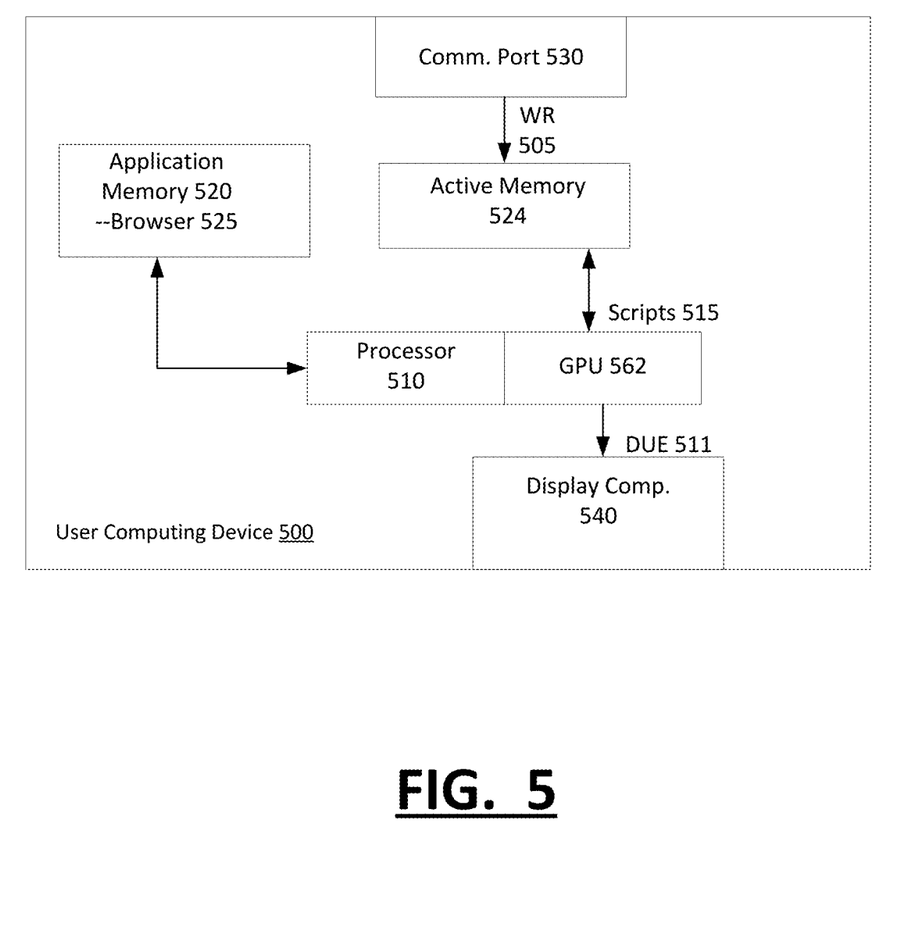
FIG. 5 illustrates a user computing device for use in connection with the various examples described herein.

FIG. 5 illustrates a user computing device for use with one or more examples, as described. In examples, a user computing device 500 can correspond to, for example, a workstation, a desktop computer, a laptop or other computer system having graphics processing capabilities that are suitable for enabling renderings of design interfaces and graphic design work. In variations, the user computing device 500 can correspond to a mobile computing device, such as a smartphone, tablet computer, laptop computer, VR or AR headset device, and the like.

In examples, the computing device 500 includes a central or main processor 510, a graphics processing unit 512, memory resources 520, and one or more communication ports 530. The computing device 500 can use the main processor 510 and the memory resources 520 to store and launch a browser 525 or other web-based application. A user can operate the browser 525 to access a network site of the network service 152, using the communication port 530, where one or more web pages or other resources 505 for the network service 152 (see FIG. 1) can be downloaded. The web resources 505 can be stored in the active memory 524 (cache).

As described by various examples, the processor 510 can detect and execute scripts and other logic which are embedded in the web resource in order to implement the ICAP 100 (see FIG. 1). In some of the examples, some of the scripts 515 which are embedded with the web resources 505 can include GPU accelerated logic that is executed directly by the GPU 512. The main processor 510 and the GPU can combine to render a collaborative medium 102 (e.g., corresponding to a workspace file 163) on a display component 540. The rendered collaborative medium 102 can include web content from the browser 525, as well as design interface content and functional elements generated by scripts and other logic embedded with the web resource 505. By including scripts 515 that are directly executable on the GPU 512, the logic embedded with the web resource 505 can better execute the ICAP 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computing system comprising:
one or more processors; and
a memory storing instructions that, when executed by the one or more processors, cause the network computing system to:
receive, from a plurality of user computing devices via one or more networks, position data from one or more of the plurality of user computing devices participating in a collaborative in a collaborative design session in an application hosting a collaborative user interface in which a design is under edit, the collaborative user interface including one or more widgets having one or more interactive objects for which interaction triggers execution of widget programming logic that modifies the collaborative user interface, the position data indicating a respective cursor position in the collaborative user interface for each respective collaborator during participating in the collaborative design session;
determine, based on the position data, that the cursor positions of one or more collaborators of the plurality of collaborators are within a bounding area of a layered widget presented in the collaborative user interface, wherein the layered widget comprises a first widget layered over a second widget, the first widget being associated with a first feedback response triggered when one of a plurality of cursors is within a bounding area of the first widget and the second widget being associated with a second feedback response triggered when one of the plurality of cursors is within a bounding area of the second widget; and
based on the determining:
determine a layered feedback response for the layered widget based on the cursor positions of the plurality of the collaborators within the bounding area of the layered widget, the layered feedback response comprising at least the first feedback response and the second feedback response being executed simultaneously, and
transmit feedback response data to each of the plurality of user computing devices to cause the layered feedback response for the layered widget to be presented on the collaborative user interface displayed in each of the plurality of user computing devices.

2. The network computing system of claim 1, wherein the executed instructions further cause the network computing system to:
receive, over the one or more networks, input data from one or more of the plurality of user computing devices, the input data indicating user inputs performed on a widget of the one or more widgets;
based on the input data, determine respective feedback responses for the user inputs performed on the widget; and
transmit, over the one or more networks, second feedback response data to the plurality of user computing devices, the second feedback response data causing each of the plurality of user computing devices to present corresponding feedback responses for the user inputs on the widget.

3. The network computing system of claim 2, wherein the corresponding feedback responses based on the user inputs on the widget are determined by performing a lookup in widget programming logic of the second widget.

4. The network computing system of claim 2, wherein the corresponding feedback responses based on the user inputs comprise at least one of fill responses or stroke responses.

5. The network computing system of claim 1, wherein the cursor positions of the plurality of the collaborators within the bounding area of the layered widget comprise hover-over actions on the layered widget.

6. The network computing system of claim 1, wherein the layered feedback response for the layered widget comprises at least one fill response and at least one stroke response.

7. The network computing system of claim 1, wherein the layered feedback response is determined by widget programming logic of the layered widget.

8. A non-transitory computer-readable medium that stores instructions, which when executed by one or more processors of a computing system, cause the computing system to perform operations comprising:
receiving, from a plurality of user computing devices via one or more networks, position data from one or more of a the plurality of user computing devices participating in a collaborative design session in an application hosting a collaborative user interface in which a design is under edit, the collaborative user interface including one or more widgets having one or more interactive objects for which interaction triggers execution of widget programming logic that modifies the collaborative user interface, the position data indicating a respective cursor position on in the collaborative user interface for each respective collaborator participating in the collaborative design session;
determining, based on the position data, that the cursor positions of a one or more collaborators of the plurality of the collaborators are within a bounding area of a layered widget presented in the collaborative user interface, wherein the layered widget comprises a first widget layered over a second widget, the first widget being associated with a first feedback response triggered when one of a plurality of cursors is within a bounding area of the first widget and the second widget being associated with a second feedback response triggered when one of the plurality of cursors is within a bounding area of the second widget; and
based on the determining:
determining a layered feedback response for the layered widget based on the cursor positions of the plurality of the collaborators within the bounding area of the layered widget, the layered feedback response comprising at least the first feedback response and the second feedback response simultaneously, and
transmitting feedback response data to each of the plurality of user computing devices to cause the layered feedback response for the layered widget to be presented on in the collaborative user interface displayed on each of the plurality of user computing devices.

9. The non-transitory computer-readable medium of claim 8, wherein the operations further comprise:
receiving, over the one or more networks, input data from one or more of the plurality of user computing devices, the input data indicating user inputs performed on a widget of the one or more widgets;
based on the input data, determining respective feedback responses for the user inputs performed on the widget; and
transmitting, over the one or more networks, second feedback response data to the plurality of user computing devices, the second feedback response data causing each of the plurality of user computing devices to present corresponding feedback responses for the user inputs on the widget.

10. The non-transitory computer-readable medium of claim 9, wherein the corresponding feedback responses based on the user inputs on the widget are determined by performing a lookup in widget programming logic of the widget.

11. The non-transitory computer-readable medium of claim 9, wherein the corresponding feedback responses based on the user inputs comprise at least one of fill responses or stroke responses.

12. The non-transitory computer-readable medium of claim 8, wherein the cursor positions of the plurality of the collaborators within the bounding area of the layered widget comprises hover-over actions on the layered widget.

13. The non-transitory computer-readable medium of claim 8, wherein the layered feedback response for the layered widget comprises at least one fill response and at least one stroke response.

14. The non-transitory computer-readable medium of claim 8, wherein the layered feedback response is determined by widget programming logic of the layered widget.

15. A computer-implemented method comprising:
receiving, from a plurality of user computing devices via one or more networks, position data from one or more of the plurality of user computing devices participating in a collaborative design session in an application hosting a collaborative user interface in which a design is under edit, the collaborative user interface including one or more widgets having one or more interactive objects for which interaction triggers execution of widget programming logic that modifies the collaborative user interface, the position data indicating a respective cursor position in the collaborative user interface for each respective collaborator participating in the collaborative design session;
determining, based on the position data, that the cursor positions of one or more collaborators of the plurality of the collaborators are within a bounding area of a layered widget presented in the collaborative user interface, wherein the layered widget comprises a first widget layered over a second widget, the first widget being associated with a first feedback response triggered when one of a plurality of cursors is within a bounding area of the first widget and the second widget being associated with a second feedback response when one of the plurality of cursors is within a bounding area of the second widget; and
based on the determining:
determining a layered feedback response for the layered widget based on the cursor positions of the plurality of the collaborators within the bounding area of the layered widget, the layered feedback response comprising at least the first feedback response and the second feedback response simultaneously, and
transmitting feedback response data to each of the plurality of user computing devices to cause the layered feedback response for the layered widget to be presented in the collaborative user interface displayed on each of the plurality of user computing devices.

16. The method of claim 15, wherein the cursor positions of the plurality of the collaborators within the bounding area of the layered widget comprise hover-over actions on the layered widget.

17. The method of claim 15, wherein the layered feedback response for the layered widget comprises at least one fill response and/or at least one stroke response.

18. The method of claim 15, wherein the layered feedback response is determined by widget programming logic of the layered widget.

\* \* \* \* \*

UNITED STATES PATENT AND TRADEMARK OFFICE
CERTIFICATE OF CORRECTION

| | | |
|---|---|---|
| PATENT NO. | : 12,429,995 B2 | Page 1 of 1 |
| APPLICATION NO. | : 18/121520 | |
| DATED | : September 30, 2025 | |
| INVENTOR(S) | : Bersabel Tadesse et al. | |

It is certified that error appears in the above-identified patent and that said Letters Patent is hereby corrected as shown below:

In the Claims

In Column 20, Line 17, in Claim 1, delete "in a collaborative in a collaborative" and insert -- in a collaborative --.
In Column 20, Line 26, in Claim 1, after "collaborator" delete "during".
In Column 21, Line 27, in Claim 8, delete "a the" and insert -- the --.
In Column 21, Line 35, in Claim 8, after "position" delete "on".
In Column 21, Line 61, in Claim 8, after "presented" delete "on".

Signed and Sealed this
Eighteenth Day of November, 2025

John A. Squires
*Director of the United States Patent and Trademark Office*